United States Patent
DeGeorge et al.

[11] Patent Number: 6,135,087
[45] Date of Patent: Oct. 24, 2000

[54] LAUNCH SPARK

[75] Inventors: John W. DeGeorge, Michigan Center; Robert T. Forgiel, Tecumseh; Howard W. Krausman, Dexter, all of Mich.

[73] Assignee: Chrysler Corporation, Auburn Hills, Mich.

[21] Appl. No.: 09/211,328

[22] Filed: Dec. 15, 1998

[51] Int. Cl.[7] ........................................ F02P 5/15
[52] U.S. Cl. .................. 123/406.52; 123/406.53; 123/406.55
[58] Field of Search .............. 123/406.52, 406.53, 123/406.54, 406.55

[56] References Cited

U.S. PATENT DOCUMENTS

| | | | |
|---|---|---|---|
| 3,910,243 | 10/1975 | Gau et al. | 123/406.53 |
| 4,048,964 | 9/1977 | Kissel | 123/482 |
| 4,570,596 | 2/1986 | Sato | 123/406.55 |
| 4,606,315 | 8/1986 | Tobinaga et al. | 123/406.55 X |
| 5,535,586 | 7/1996 | Ohta et al. | 123/406.55 X |
| 6,003,494 | 12/1999 | DeGroot et al. | 123/406.24 |

*Primary Examiner*—Tony M. Argenbright
*Attorney, Agent, or Firm*—Mark P. Calcaterra

[57] ABSTRACT

A spark control method for a vehicle engine is provided for enhancing engine performance and fuel economy prior to a fully warm state. The spark control method is based on coolant temperature and engine speed while accounting for an engine position and time from the start-to-run transfer. More particularly, the methodology of the present invention initially determines if the desired spark advance is before top dead center and if the throttle is open. If so, the methodology loads engine speed and coolant temperature to the engine control unit and interpolates a spark advance multiplier value. Thereafter, the current engine position pulse is loaded and an engine position pulse multiplier is interpolated and applied to the spark advance multiplier value. Next, the time since the start-to-run transfer is loaded and a time since start-to-run transfer multiplier is interpolated and applied to the spark advance multiplier value. Finally, the spark is advanced via the spark advance multiplier value, as adjusted by the engine position pulse multiplier and the time since start-to-run transfer multiplier. Upon engine operation reaching an after top dead center condition or when the throttle is closed, the methodology of the present invention is exited and engine operation is returned to normal spark control.

20 Claims, 2 Drawing Sheets

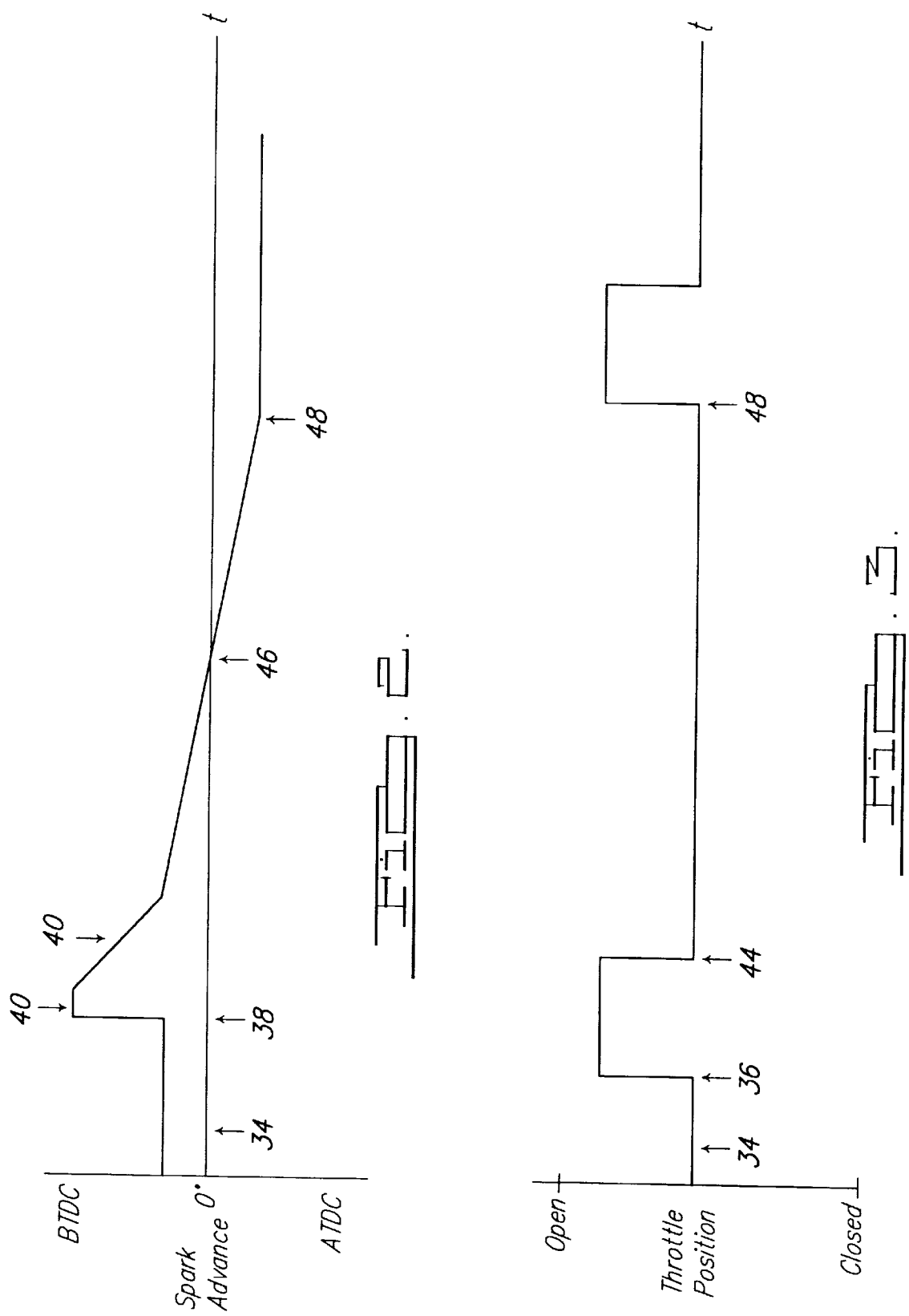

LAUNCH SPARK

BACKGROUND OF THE INVENTION

1. Technical Field

The present invention generally relates to spark control for motor vehicle engines and, more particularly, to spark control for optimizing cold engine operation.

2. Discussion

It is known that high drivability index (DI) fuels have a slower burn rate when cold. It is also known that optimum torque points are different during cold engine operation than during warm engine operation due to the slower burn rate of high drivability index fuels. Therefore, without modification to the operating parameters of the engine, the potential for poor performance and fuel economy exists until the engine reaches a fully warm state.

One approach for compensating for the slower burn rate of high drivability index fuels during cold operation has been to enrich the fuel beyond stoichiometry. While this technique improves drivability, it has certain drawbacks. For instance, enriching the fuel may lead to poorer fuel economy than at stoichiometry. Further, enriching the fuel during cold operation may require frequent catalyst light off to burn excess fuel. This may lead to emission concerns as well as a possible reduction in the life of the catalyst.

In view of the foregoing, it would be desirable to compensate for the slower burn rate of high drivability index fuel during cold operation through the use of spark advance. It would also be desirable to use spark advance independently of or in concert with the fuel enrichment approach to account for lag during cold operation while protecting the catalyst and without sacrificing fuel economy.

SUMMARY OF THE INVENTION

The above and other objects are provided by advancing spark based on coolant temperature and engine speed. Further, the amount of spark advance accounts for engine position and time from the start-to-run transfer so that specific engine operating regions which are most vulnerable to drive problems are compensated. As such, drivability issues and the effect on catalyst light off are minimized. More particularly, the methodology of the present invention initially determines if the desired spark advance is before top dead center and if the throttle is open. If so, the methodology loads engine speed and coolant temperature to the engine control unit (ECU) and interpolates a spark advance multiplier value. Thereafter, the current engine position pulse is loaded and an engine position pulse multiplier is interpolated and applied to the spark advance multiplier value. Next, the time since the start-to-run transfer is loaded and a time since start-to-run transfer multiplier is interpolated and applied to the advance multiplier value. Finally, the spark is advanced via the spark advance multiplier value as adjusted by the engine position pulse multiplier and the time since start-to-run transfer multiplier. Upon engine operation reaching an after top dead center condition or when the throttle is closed, the methodology of the present invention is exited and engine operation is returned to normal spark control.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 2 is a graph illustrating spark advance as controlled by the present invention as a function of time; and FIG. 3 is a graph illustrating the throttle position as it relates to the spark advance control condition illustrated in FIG. 2.

DETAILED DESCRIPTION OF THE PREFERRED EMBODIMENTS

Figure 1:
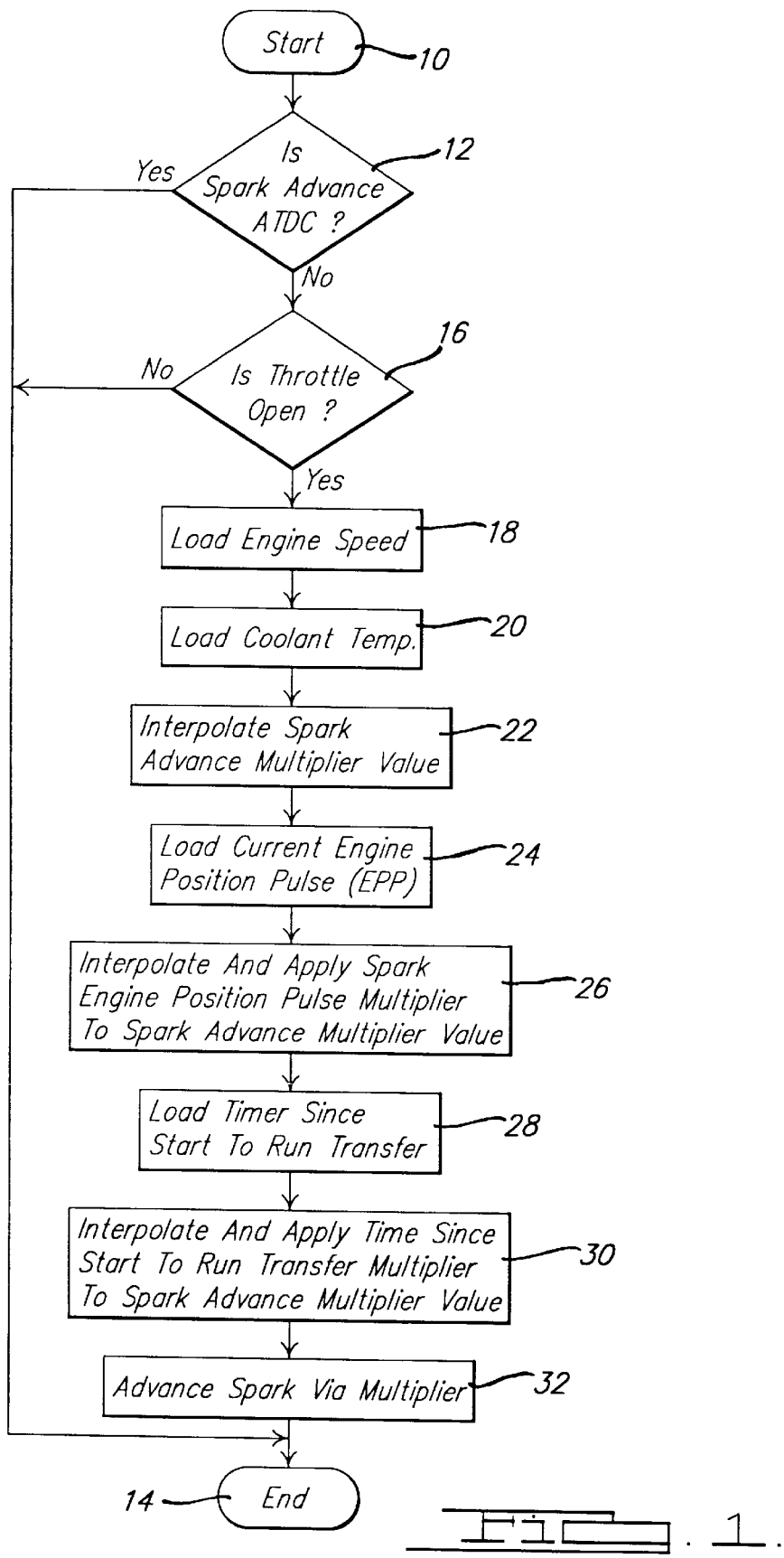
FIG. 1 is a flow chart illustrated the methodology of the present invention.

The present invention is directed towards optimizing engine performance and drivability of a motor vehicle during cold operation through spark control. More particularity, spark is advanced based on coolant temperature and engine speed. Also, engine position and the time since a start-to-run transfer are applied to the spark advance to avoid over sparking the engine during warm up.

Referring now to the drawing figures, a flow chart illustrating the methodology of the present invention is depicted in FIG. 1. The methodology begins at bubble 10 and falls through to decision block 12. In decision block 12, the methodology determines if the current spark advance is after top dead center. If so, the methodology advances to bubble 14 to resume normal engine spark control. However, if the current spark advance at decision block 12 is not after top dead center, the methodology advances to decision block 16.

In decision block 16, the methodology determines if the throttle is open. If not, the methodology advances to bubble 14 and resumes normal spark control. However, if the throttle is open at decision block 16, the methodology continues to block 18. For the purposes of this description, the throttle is "open" at both part throttle and wide open throttle.

In block 18 the methodology loads engine speed to the vehicle's engine control unit. While many techniques are available for determining engine speed, it is presently preferred to measure engine speed using a sensor in combination with a toothed wheel coupled to the engine crank shaft. Further, although engine speed and the remaining parameters to be described below may be loaded into a dedicated controller or microprocessor, it is presently preferred to store and manipulate these values in the vehicle's engine control unit to take advantage of the numerous operating parameters (such as engine speed) that are commonly stored and manipulated therein for a variety of applications.

From block 18 the methodology continues to block 20 where the coolant temperature is loaded to the engine control unit. From block 20, the methodology continues to block 22 where the engine control unit determines, preferably through interpolation, a spark advance multiplier value. While many techniques are available for determining the spark advance multiplier value, it is presently preferred to utilize a look-up table in the form of a 9×9 three-dimensional (3-D) surface having the coolant temperature along the X axis, engine speed along the Y axis and the multiplier value along the Z axis. The 9×9 three-dimensional surface may be generated by testing using a dynamometer taking into account optimum fuel economy and mean best torque. Further, the coolant temperature along the X axis may be circumscribed within preselected limits such as −40 to 260° F. and the multiplier is preferably limited to a value between 0 and 0.996.

After interpolating this spark advance multiplier value at block 22, methodology continues to block 24 and loads the current engine position pulse (EPP) to the engine control unit. One skilled in the art will appreciate that modern motor vehicles include an engine position pulse generator for a myriad of purposes. The present invention takes advantage of the engine position pulse's availability. The methodology continues from block 24 to block 26 and determines, preferably through interpolation, and applies a spark engine position pulse multiplier (based on the current engine position pulse) to the spark advance multiplier value determined at block 22. It is presently preferred to determine the spark engine position pulse multiplier using a look-up table in the form of a two dimensional table having the engine position pulses along the X axis and the spark engine position pulse multiplier along the Y axis. The two-dimensional table may be generated by testing as above described regarding the 9×9 three-dimensional surface. The engine position pulses along the X axis preferably range from 0 to 255 while the spark engine position pulse multiplier is limited to a valve between 0 and 0.996. As such, once a sufficient number of engine position pulses occur (e.g., greater that 255) the spark advance multiplier value is forced to zero. Thus, no increase in spark advance is thereafter applied. Accordingly, over sparking is prevented.

After applying the spark engine position pulse multiplier to the spark advance multiplier value at block 26 the methodology continues to block 28 and loads the value of a timer which has elapsed since the engine's start-to-run transfer to the engine control unit. From block 28, the methodology continues to block 30 where the engine control unit determines, preferably by interpolation, a time since start-to-run transfer multiplier (based on the timer valve) and applies it to the spark advance multiplier value originally determined at block 22. The time since start-to-run transfer multiplier is preferably determined using a look-up table in the form of a two-dimensional table having time in seconds since the start-to-run transfer along the X axis and the time since start-to-run transfer multipliers along the Y axis. The time in seconds is preferably in a range between 0 and 818.8 while the multiplier is limited to a value between 0 and 0.996. Thus, after a sufficient time has passed since the engine transitions from a start mode to a run mode, (e.g., longer than 818.8 sec.), the spark advance multiplier is forced to zero. Again, no increase in spark advance is thereafter applied. Accordingly, over sparking is prevented. It should be noted that the time since start-to-run transfer allows the methodology to infer port temperature. At a certain port temperature no additional spark advance is required.

After determining and applying the time since start-to-run transfer multiplier to the spark advance multiplier value at block 30, the methodology continues to block 32 where the engine control unit advances the engine spark via the spark advance multiplier value (block 22) as adjusted by the spark engine position pulse multiplier (block 26) and the time since start-to-run transfer multiplier (block 30). Preferably, the amount of advancing takes the form of: 1+ the spark advance multiplier value * the spark engine position pulse multiplier * the time since start-to-run transfer multiplier. After advancing the spark at block 32, the methodology advances to bubble 14 pending another execution of the control loop. Preferably, the control loop is executed every 12.544 milliseconds so that a new spark advance multiplier value will be quickly determined. It is also preferred that the multiplier applied at block 32 be stored in a RAM location and the normal spark advance control in the 69° interrupt.

It should be appreciated from the methodology described in FIG. 1, that the spark advance multiplier value is eventually driven to zero because of changes in engine speed or coolant temperature, because the spark engine position pulse multiplier is driven to zero based on engine position, or the time since start-to-run transfer will be driven to zero based on the time since the start-to-run transfer. As such, the value of the spark advance multiplier as determined at block 32 defaults to one over time such that the total spark is thereafter unaffected.

Referring to FIGS. 2 and 3, graphic displays of spark advance and throttle position over time are illustrated. At time 34, the spark advance is before top dead center (BTOC) and the throttle position is closed. At time 36, the throttle position is opened. Shortly thereafter (as soon as the method of FIG. 1 is completed), at time 38, the methodology advances the spark utilizing the spark advance multiplier value as adjusted by the spark engine position pulse multiplier and time since start-to-run transfer multiplier as described above with reference to FIG. 1. At time 40, the spark advance is held at the advanced level pending changes in engine speed and coolant temperature. Thereafter, at time 42, the spark advance is removed as a function of engine position pulse and time since start-to-run transfer. At time 44, when the throttle is closed, or time 46, when the spark advance goes to after top dead center (ATDC), whichever occurs first, spark control according to the present invention is suspended and returned to normal engine control. Further, at time 48, when the throttle returns to an open position but the spark advance is after top dead center, no additional spark advance is applied.

According to the present invention, the total spark advance is reduced over time so that engine operation is optimized as the engine warms. In other words, as the mean best torque points shift from cold engine operation to warm engine operation, the spark advance is reduced accordingly. Since cold engine operation converts to warm engine operation over time, the spark advance is reduced over time such that at each point in time optimum engine performance is maintained. Furthermore, the propensity for engine knock due to over advancing is minimized.

As described above, the spark advance may be held at its multiplied value (i.e., advanced state) for a given time period so that a certain engine position is reached prior to its reduction. On the other hand, depending on how the system is calibrated, the multiplied spark advance may be immediately reduced. It should also be noted that the spark advance multiplier value is applied to the total spark advance which also accounts for engine load, engine speed, EGR, and other input parameters.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling the operation of an engine during cold operating conditions comprising:

determining a spark advance based on engine speed and coolant temperature;

adjusting said spark advance by a spark engine position pulse multiplier;

adjusting said spark advance by a time since a start-to-run transfer; and advancing a total spark for said engine according to said spark advance as adjusted by said spark engine position pulse multiplier and said time since said start-to-run transfer.

2. The method of claim 1 wherein said spark advance is determined from a look-up table including engine speed and coolant temperature.

3. The method of claim 1 wherein said spark engine position pulse multiplier is determined from a look-up table including a plurality of engine positions.

4. The method of claim 1 wherein said time since said start-to-run transfer is determined from a look-up table including a plurality of times since said start-to-run transfer.

5. The method of claim 1 further comprising determining said spark advance only if a current spark advance is not after top dead center.

6. The method of claim 1 further comprising determining said spark advance only if a throttle position is open.

7. The method of claim 1 wherein said spark advance is forced to zero as said engine speed and coolant temperature increase.

8. The method of claim 1 wherein said spark engine position is set to zero after a preselected number of engine position pulse multiplier pulses have been tabulated.

9. The method of claim 1 wherein said time since said start-to-run transfer is set to zero after a preselected time period from said start-to-run transfer.

10. A method of optimizing engine operation during cold launch comprising:

determining engine speed;

determining coolant temperature;

determining a spark advance multiplier value based on said engine speed and said coolant temperature;

determining a current engine position pulse value;

determining a spark engine position pulse multiplier based on said current engine position pulse value;

determining a time since a start-to-run transfer;

determining a time since start-to-run transfer multiplier based on said time since said start-to-run transfer; and advancing a total spark setting of said engine according to said spark advance multiplier value as adjusted by said spark engine position pulse multiplier and said time since start-to-run transfer multiplier.

11. The method of claim 10 further comprising only performing said determining steps if a current spark advance is not after top dead center.

12. The method of claim 10 further comprising only performing said determining steps if a throttle position is open.

13. The method of claim 10 further comprising not advancing said total spark only if one of said engine speed and said coolant temperature is above a given threshold valve.

14. The method of claim 10 further comprising not advancing said total spark only if said current engine position pulse value is greater than a preselected value.

15. The method of claim 10 further comprising not advancing said total spark only if said time since said start-to-run transfer is greater than a preselected value.

16. A method of compensating for slower burn rates of high drivability index fuels at cold operating conditions to improve engine performance through spark control comprising:

determining a current spark advance;

continuing only if said current spark advance is not after top dead center;

determining a throttle position;

continuing only if said throttle position is open;

determining engine speed;

determining coolant temperature;

determining a spark advance multiplier value based on said engine speed and said coolant temperature;

determining a current engine position pulse value;

determining a spark engine position pulse multiplier based on said current engine position pulse value;

determining a time since a start-to-run transfer;

determining a time since start-to-run transfer multiplier based on said time since said start-to-run transfer; and advancing a total spark setting of said engine according to said spark advance multiplier value as adjusted by said spark engine position pulse multiplier and said time since start-to-run transfer multiplier.

17. The method of claim 16 further comprising forcing said spark advance multiplier value to zero as said engine speed and coolant temperature increase such that said total spark is not advanced after one of said engine speed and said coolant temperature reach a given threshold value.

18. The method of claim 16 further comprising forcing said engine position pulse multiplier to zero as said number of engine position pulses increase such that an amount of said advancing of said total spark is reduced over time.

19. The method of claim 16 further comprising forcing said time since start-to-run transfer multiplier to zero as said time since said start-to-run transfer increases such that an amount of said advancing of said total spark is reduced over time.

20. The method of claim 16 further comprising advancing said total spark advance only if each of the group including engine speed, coolant temperature, number of engine position pulses and time since start-to-run transfer is below a preselected threshold.

* * * * *